Oct. 31, 1967   R. W. TWIGG   3,350,255
TAPE-WRAPPING MACHINE
Filed Jan. 10, 1964   5 Sheets-Sheet 1

INVENTOR.
Robert W. Twigg,
BY
Wolfe, Hubbard, Voit & Osann
Attorneys.

Oct. 31, 1967
R. W. TWIGG
3,350,255
TAPE-WRAPPING MACHINE
Filed Jan. 10, 1964
5 Sheets-Sheet 2
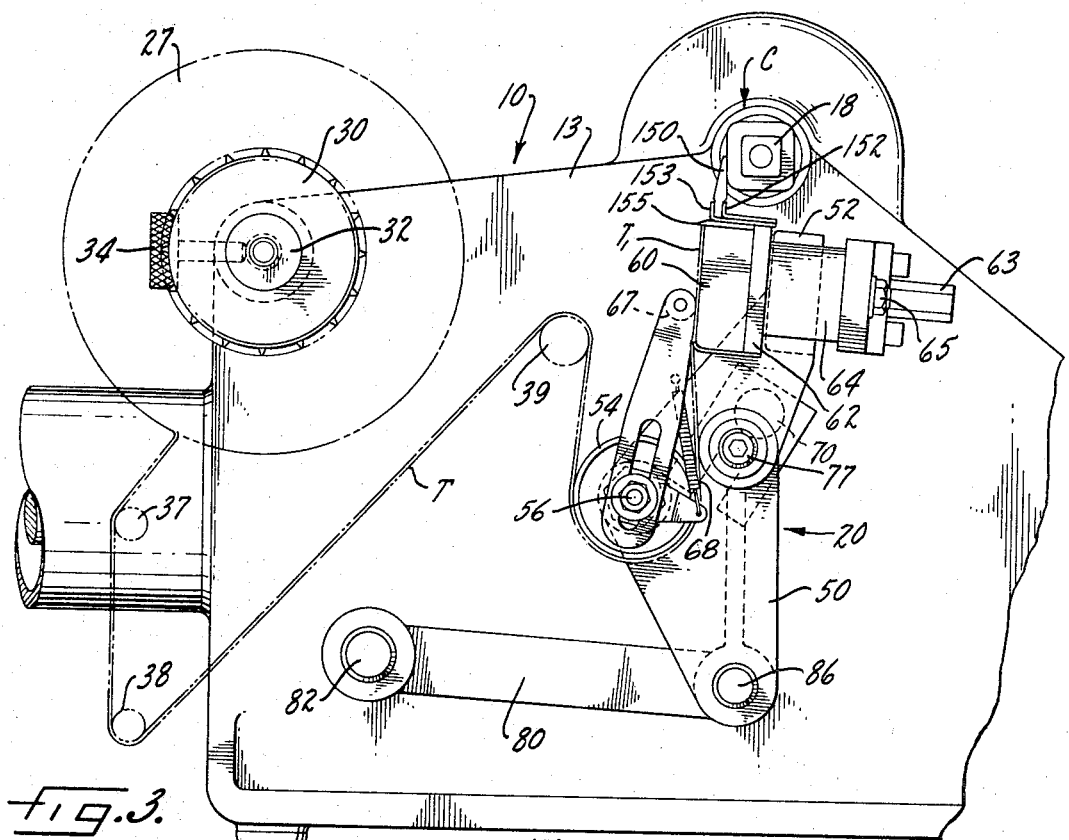
fig.3.
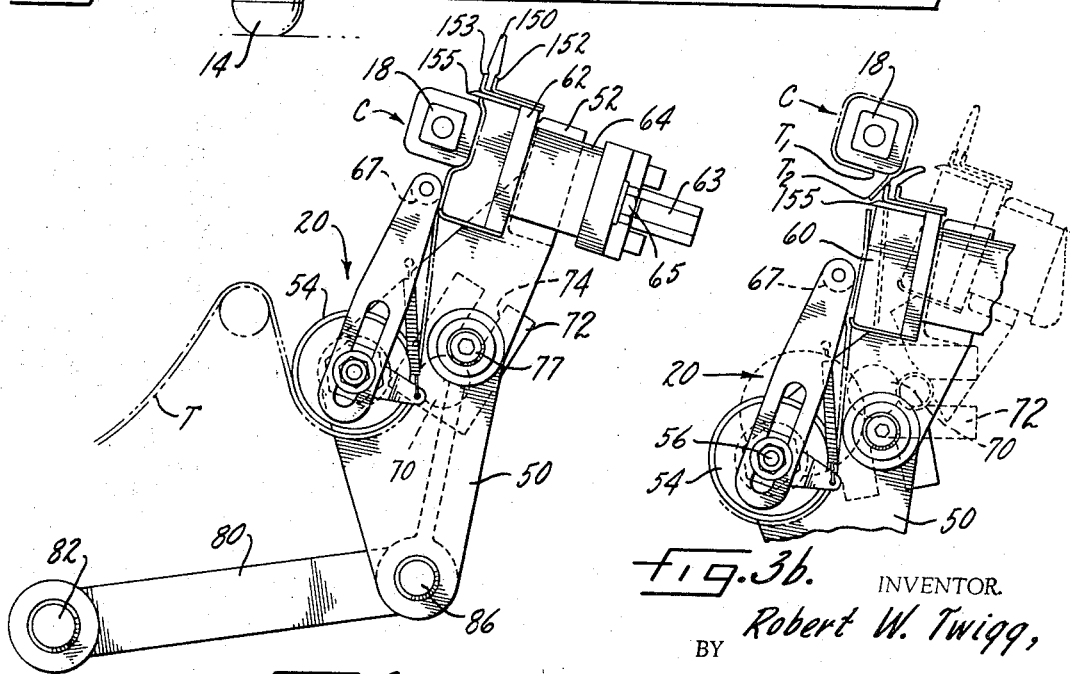
fig.3a.
fig.3b.
INVENTOR.
Robert W. Twigg,
BY
Wolf, Hubbard, Voit & Osann
Attorneys.

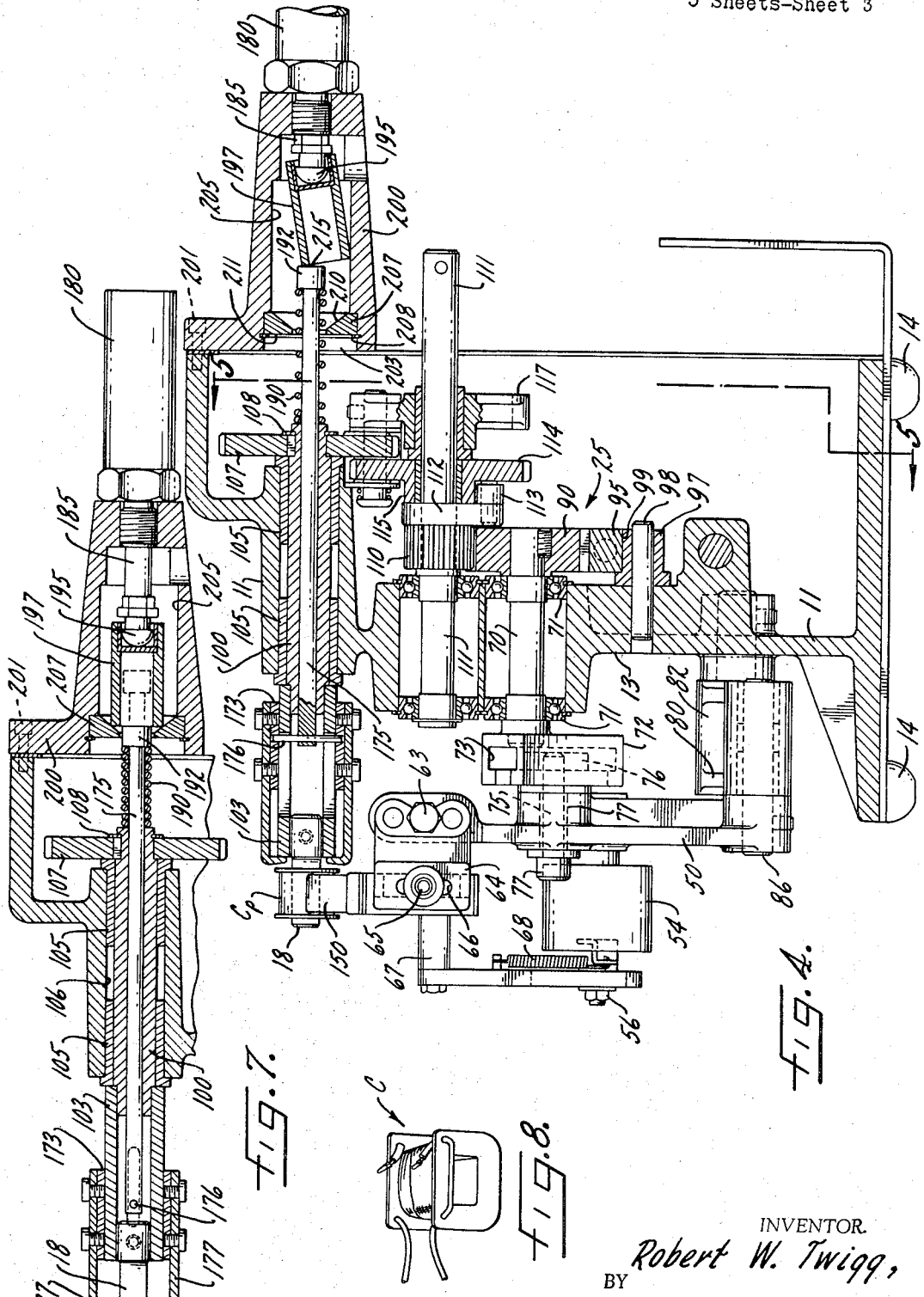

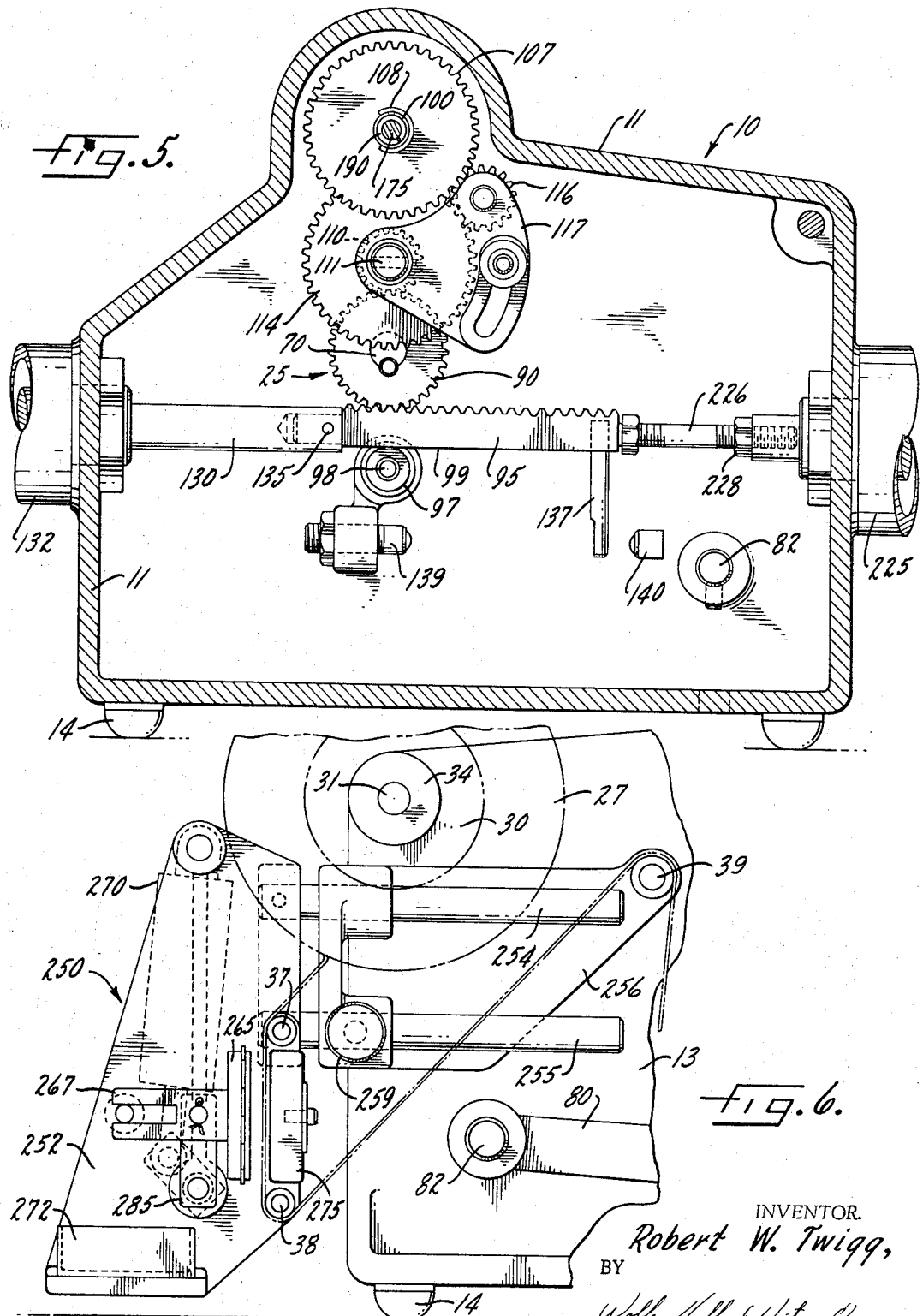

Oct. 31, 1967   R. W. TWIGG   3,350,255
TAPE-WRAPPING MACHINE
Filed Jan. 10, 1964   5 Sheets-Sheet 5

INVENTOR.
Robert W. Twigg,
BY
Wolf, Hubbard, Voit & Osann
Attorneys.

3,350,255
TAPE-WRAPPING MACHINE
Robert W. Twigg, Rockford, Ill., assignor to Midland Engineering and Machine Co., Rosemont, Ill., a corporation of Illinois
Filed Jan. 10, 1964, Ser. No. 339,838
6 Claims. (Cl. 156—475)

ABSTRACT OF THE DISCLOSURE

A machine for wrapping tape around an article such as an electrical coil, which receives the article and then, in automatic sequence, applies the end of a supply of tape to the article, rotates the article to wrap the tape around it, severs the tape and wipes the severed end against the article, ejects the wrapped article, and pulls more tape from a supply roll to be ready for the next article. The tape is applied, severed, wiped and pulled from the roll by a cyclically moving feeder arm carrying a pad, blade and tape-pulling roller.

---

This application is a continuation-in-part of application Ser. No. 282,093, filed May 21, 1963, now abandoned.

Description of the invention

The present invention relates to devices for automatically wrapping the permieter portions of object such, for example, as electrical coils, with adhesive material.

It is an object of the present invention to provide a high-speed machine for neatly wrapping pressure sensitive tape abount the periphery of an object, such as an electrical coil. It is a related object to provide a machine whereby a single person can wrap a large number of objects with tape with a minimum of physical effort and within a short period of time so as to effect a high output per man-hour.

It is another object to provide a machine for wrapping tape about objects to be taped, which machine performs a variety of integrated sequential functions previously requiring manual effort to accomplish the complete operation, including coding of the tape and ejection of the finished product, in a fraction of the time and cost previously required.

It is a further object to provide a machine of the type required which may be interrupted during its cycle of operation to perform some function on the object being wrapped, and then reactuated to complete the machine cycle, thus providing versatility without sacrifice of speed and automation.

Still another object of the invention is to provide novel apparatus for accomplishing the timed wrapping and ejection of the wrapped article from the machine with a single power system having a minimum of expensive valves and directional controls.

These and other objects and advantages of the present invention will become more apparent from a study of the foregoing detailed specification, in conjunction with the drawings, wherein:

FIG. 3 is a side elevation of a portion of the machine of FIG. 1 somewhat simplified to emphasize the tape-wrapping mechanism;

FIGS. 3a and 3b are fragmentary elevations similar to FIG. 3 which illustrate the tape-wrapping mechanism of FIG. 3 in various operative positions during the wrapping process;

FIG. 4 is a vertical section of the device taken transverse to the side elevation of FIG. 3;

FIG. 5 is a section taken along line 5—5 of FIG. 4;

FIG. 6 is a side elevation of the coder mechanism;

FIG. 7 is a fragmentary section similar to a portion of FIG. 4 illustrating the ejector in an alternate position;

FIG. 8 is a representative coil of the type which the machine of the present invention is capable of wrapping;

Figure 1:
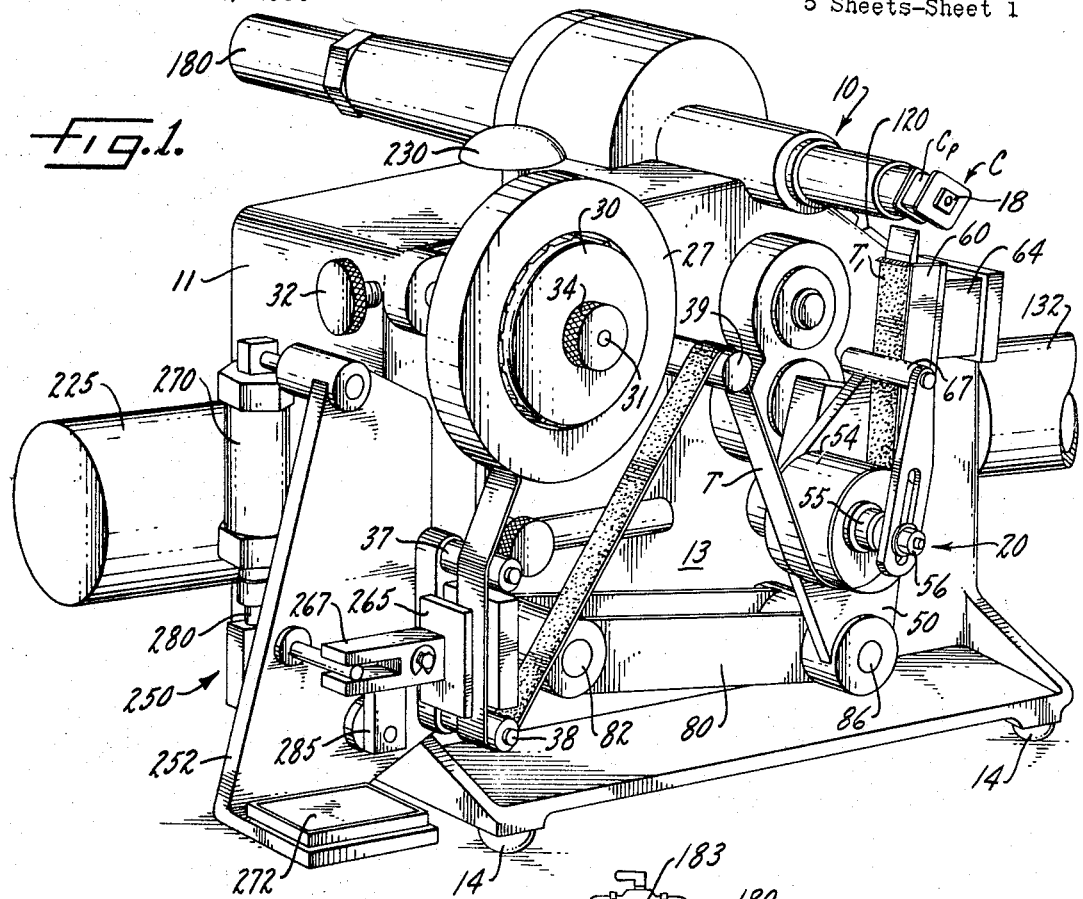
FIGURE 1 is a perspective elevation of a machine embodying the various aspects of the present invention.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Turning now to the drawings, and particularly to FIG. 1, a machine 10 is illustrated which embodies the invention, and in order to more fully understand the structure and operation thereof, it will be helpful to initially examine the machine in its broader aspects.

Thus, the machine 10 includes a casing 11 which houses the internal mechanism as is illusutrated in FIGS. 4, 5 and 7, and additionally supports the actual wrapping apparatus which is mounted on the face 13 of the housing. A number of feet 14 are disposed on the base of the housing and function both as shock absorbers and friction grippers so that the machine may be operated without permanent installation, on a bench or like work area, close to a convenient power source.

The present invention discloses a single compact machine, an exemplary one of which is illustrated in FIGURE 1 for performing a number of sequentially integrated operations resulting in the complete wrapping of a selected object. To this end, means is provided adjacent the face of 13 of the housing, within easy view of, and accessable to, the single operator required to use the machine, for mounting and storing a quantity of the wrapping material to be used. In this regard it will be appreciated that, for the purpose of describing the invention, the term "tape" is used throughout the specification in its exemplary sense and is intended to encompass any of the various available forms of wrapping materials. The description of the operation of the machine will be keyed to the application of pressure sensitive tapes. It is contemplated, however, that the machine may be modified to employ other wrapping materials without departing from the invention.

In a like manner, the object or article to be wrapped or taped by the machine will be shown and described as an electrical coil C, such as that shown in FIG. 8, which is mounted on an appropriately sized arbor 18 extending from the housing. It has been found that machines constructed in accordance with the present invention have particular, but not exclusive utility, in wrapping electrical parts, such as the coil shown. Such an article is intended, however, as representative of objetcs which might be wrapped on such machines, and its use here serves merely to demonstrate the invention in accordance with one of its significant uses.

In accordance with the invention, a machine is provided for applying a measured amount of tape to the perimeter of a coil disposed on the arbor 18, and in accomplishing this, a tape feeder mechanism or applicator linkage, indicated generally by the numeral 20, illustrates an exemplary apparatus for efficiently applying tape to the coil.

The complete wrapping of any object contemplated by the invention requires a number of interrelated steps, including application of the end of the tape to the object, actual wrapping of the portion of the object to be covered in such a manner that a smooth and neat surface is presented with minimum waste of material, severing the tape at the required length, and securing the loose ends of the tape subsequent to its being severed.

It is an attribute of this invention that the above-noted functions are successfully carried out automatically and with optimum speed so as to permit a single operator to wrap a large number of objects per man-hour worked.

Having now considered the invention in its broader aspects, a more detailed description of the various exemplary operative elements which combine to perform the wrapping function will be provided. It is in keeping with the efficient operation of the device that an adequate tape supply be readily at hand to permit extended operation without shut-down times for reloading. Accordingly, provision is made for the storage and use of a quantity of tape in rolls of any suitable standard size such as roll 27. In order to minimize waste and insure the neatness of the job, it is desirable to provide firm control of the tape throughout the wrapping operation by removing only that amount of tape from the roll which is needed to accomplish the wrapping of the specific object mounted on the arbor 18. To this end, the roll 27 is mounted on a tensioning drum 30, having a diameter of sufficient size to receive and hold the particular tape roll used. The drum is secured on a shaft or spindle 31 which is held in the housing by a thumb screw 32. A knurled thumb screw 34 on the end of the spindle permits the adjustment of the degree of frictional engagement between the drum and spindle so as to control the degree of freedom of the drum to rotate thereon. By controlling the ease with which the drum revolves about the spindle, a predetermined amount of pressure may be maintained on the tape as it is pulled from the roll, thereby minimizing the chance that the tape will double up or stick to itself or to other parts of the machine and interfere with the smooth and continuous operation of the device.

From the roll 27, the tape is threaded over guide spindles such as those indicated at 37, 38 and 39, which serve to maintain control of the tape as it is pulled from the roll and threaded into the feeder mechanism 20 and thus prevent creases or folds in the tape prior to wrapping.

Application of the tape to the coil on the arbor is accomplished, in accordance with this embodiment of the invention, by the coordinated operation of the arbor and tape feeder mechanism 20. In accomplishing this, the tape feeder mechanism initially applies the lead edge $T_1$ of the tape T to the perimeter of the coil C mounted on the arbor with the adhesive surface toward the coil, and then in cooperation with the rotating arbor 18, presses the required amount of tape to the perimeter $C_p$ for wrapping the same with a smooth and even layer, or as much of the surface as is desired to be covered. Finally, it severs the tape at the correct length and presses the trailing edge $T_2$ (FIG. 3b) of that applied to the coil into place to complete the job, and returns to its starting position adjacent the arbor in condition for wrapping the next coil placed on the arbor.

Thus, referring particularly to FIGS. 1, 3, 3a and 3b, the tape feeder mechanism 20, constructed in accordance with the invention, comprises a main feeder arm 50 which is elongated, having a mounting flat 52 formed at the upper end thereof as viewed in the drawings. In order to provide more positive control over the tape, a feed roller 54 is provided on the arm, which is mounted by way of a one-way clutch 55 to a shaft 56 fastened to the arm. The roller is provided with a smooth perimeter which engages the adhesive side of the tape. The clutch permits only counterclockwise rotation of the roller so as to maintain the tape taut as it comes from the threader guide spindle 39, and inhibits external pressure on the tape from pulling the tape from the feeder.

The adhesive side of the tape must be carefully applied to the coil perimeter without damage thereto, but with sufficient pressure to secure the tape regardless of surface irregularities. In accomplishing this, a tape applicator 60 of resilient material such, for example, as sponge rubber, is secured to the mounting flat 52 at the end of the arm by means of a frame assembly 62. The frame 62 is positioned transverse to the plane of the flat 52 by adjustment nut 63 which controls the relative position of the arm and a bracket 64, to which the frame is secured by a screw 65. The bracket has a vertical slot 66 for permitting vertical adjustment of the pad position. Thus the pad is adjustable to accommodate coils of various sizes.

In threading the tape feeder, the tape is placed about the roll cylinder 54, and the end $T_1$ is then placed flush against the applicator pad 60 where it is held by a roller 67, which is continuously biased toward the pad by a spring 68.

In applying the tape, the feeder arm 50 is driven in a path as shown in FIGS. 3, 3a and 3b by means of an oscillating crank shaft 70 which is journaled in bearings 71 on the face 13 of the casing. A throw 72 having an axial T-slot 73 formed therein is brazed or otherwise secured to the shaft 70. A driving engagement is provided between the arm and crank by means of a transverse screw 75 which screws into a T-nut 76 disposed in the slot 73. The arm is prepositioned and the screw 75 then tightened so as to fix the initial arm position with respect to the throw 72 which adjustment ultimately controls the arm path and permits additional adjustment for coils of varying size. The screw 75 is mounted in a bushing 77 which permits it to be tightened without affecting the freedom of the arm to rotate about it.

So as to control movement of the arm within the desired path to effect wrapping of the coil, a guide arm 80 is provided which, by controlling the freedom of movement of the lower end of the arm 50 causes, in conjunction with the crank throw 72, the applicator 60 to traverse a path which will apply the tape to the coil, and in the embodiment illustrated in FIGS. 3, 3a, 3b, press the tape to the perimeter thereof. The guide arm is journaled on a shaft 82 secured in the casing at the desired distance from the lower end of the feeder arm. The free end of the guide arm and the lower end of the feeder arm 50 are joined by a pivot pin 86 passing through apertures formed, respectively, in each.

Figure 2:
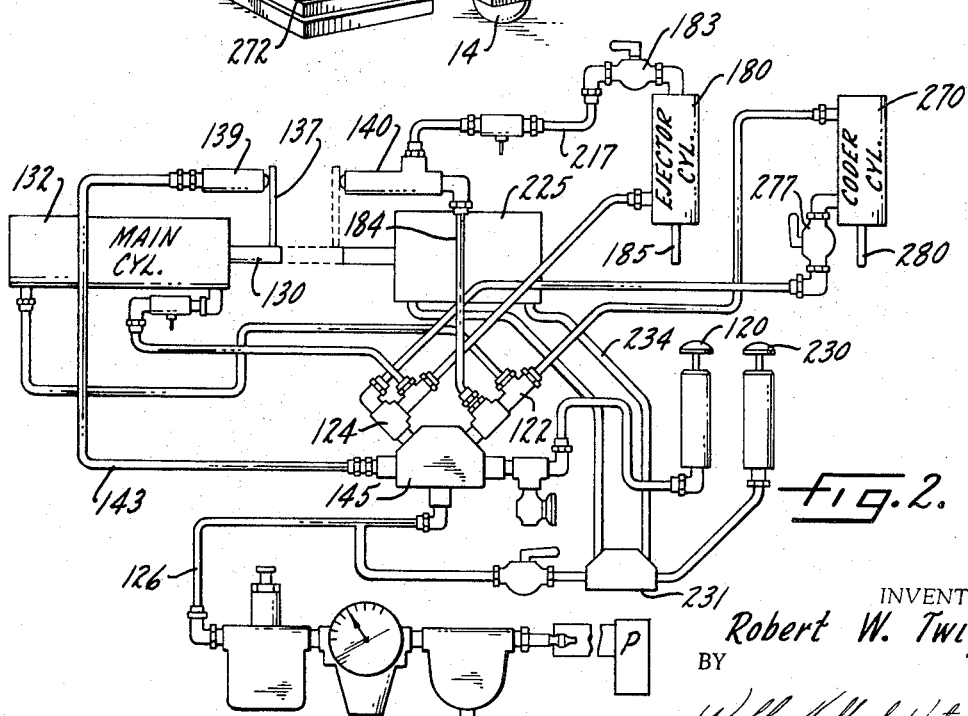
FIG. 2 is a diagram of the pneumatic circuit for operating the machine of FIG. 1.

Since actual wrapping is a coordinated function of arbor rotation and tape feeder arm operation, timed, powered control of these elements is an important aspect of the invention. Such control is suitably provided by a pneumatic motive system connected with a drive transmission which integrates and coordinates through various machine functions. The precise mode of power, however, is a matter of convenient choice. Referring particularly to FIGS. 2, 4 and 5, an exemplary means of accomplishing the above is illustrated.

In the embodiment shown, it has been found that the arrangement shown lends itself well to an arcuate oscillating drive motion of the crank, although a full revolving motion and appropriate arm linkage might be devised within the scope of the invention. The crank 72 is caused to oscillate through an arc of approximately 180° by means of a gear 90 suitably keyed to the shaft 70, within the casing, which engages a reciprocable rack 95. The rack is supported in part by a roller 97 mounted on a pin 98 and positioned so that the roller engages the lower, smooth surface 99 of the rack.

In order to provide precise coordinated control of the arbor with respect to the movement of the feeder arm, the arbor 18 is mounted to a shaft 100 by means of an extension sleeve 103. The shaft is journaled for rotation in the bearing 105, secured in a passage 106 formed in the casing of the machine 10. A gear 107 is secured on the end of the shaft opposite the arbor by any suitable means such as a clip 108. The above arbor driving elements cooperate with a gear transmission connected with the power source and illustrated particularly in FIGS. 4 and 5. The power train includes the gear 90 engaging a pinion 110 mounted on a shaft 111 which also carries a bracket 112 on which a pawl 113 is mounted. A larger gear 114 is journaled on the shaft 111 and has a notched flange 115 which is engageable by the pawl 113 to provide a unidirectional drive clockwise as seen in FIG. 5, of gear 114 by gear 110. It will also be seen that shaft 111 is extended outside the housing to permit manual operation for adjusting the timing of the machine elements or in the event of a temporary power failure.

The arbor shaft 100 and feeder arm are drivingly engaged by means of a pinion 116 which is journaled to a swingable arm 117 which is journaled on, and pivoted about the shaft 111. The swingable mounting of the pinion 116 provided by the arm 117 allows the gear 107 to be replaced, upon removing the clip 108, by a gear of different diameter, whereupon the pinion 116 is swung on the arm 117 to maintain driving engagement between the gear 114 and the shaft 100.

It is an attribute of the present invention that, once actuated the wrapping function is carried on automatically. Accordingly, the machine operation is initiated by the depression of a palm button 120 (FIG. 2) which reduces the air pressure in the main branch line 122, which was previously charged from the pressure source through main line 126. The pressure in main branch line 124 remains at input pressure and thus forces a plunger 130 attached to a piston in the main cylinder 132 to the left as seen in FIGS. 2 and 5. The drive rack 95, which is attached to the plunger 130 by a pin 135, is likewise moved leftward, causing a clockwise rotation of the feeder pinion 90 as seen in FIG. 5. Referring to FIG. 3, the retraction of the rack as noted results in a counterclockwise rotation of the slotted throw 72. The throw, which drives the pin 75 urges the arm 50 to the right as seen in FIG. 3 and upward. Because the lower end of the arm is constrained by the control arm 80 the feeder arm movement is controlled, and as the rack completes its leftward traverse, the feeder arm approaches the position shown in FIG. 3a.

So as to initially secure the adhesive end of the tape to the coil perimeter $C_p$, movement of the feeder arm during the last few degrees of rotation of the throw 72 brings the applicator 60 and thus the tape end $T_1$ into firm engagement with the coil C.

When the arm has reached the position of FIG. 3a and the tape has been pressed to the coil perimeter, the arm movement is altered to accomplish complete wrapping, and this is effected again through the main cylinder 132 and the associated rack 95. Referring to FIGS. 2 and 5, a stop arm 137 is mounted to the rack in line with a pair of limit valves 139, 140 which are positioned so as to control the rack travel by varying the pressure on the cylinder piston and thus the stroke of the plunger 130. Thus, as the feeder arm reaches the FIG. 3a position, the stop arm 137 depresses the valve 139 which causes line 143 to be exhausted. This pressure change results in the shifting of a spool (not shown) in the main directional valve 145 which is of a construction well known in the art. The shaft in the spool reverses the pressure conditions in main branch lines 122 and 124, thereby diverting high pressure to the left side of the main cylinder while the right side is exhausted, and the plunger direction is thus reversed so as to now push the rack 95 to the right.

As noted above, whereas the arbor was stationary and the pinion 116 in its disengaged position during the leftward travel of the rack, rightward movement of this rack causes clockwise rotation (as seen in FIG. 5) of gear 110 and thus engagement of the gear train 25 through the pawl 113 to drive the arbor shaft 100.

Looking at FIGS. 3a and 3b, the rotational direction of the slotted throw 72 is reversed and now clockwise, causing a downward and leftward arm movement. At the same time, the arbor 18 is being rotated in a counterclockwise direction as seen in FIG. 3. The coil thus rotated draws tape from the roll and about its periphery, with the tension roller 67 maintaining an even wrapping pressure on the tape.

A wiping finger 150 is mounted directly to the tape feeder mechanism 20, where it is secured in any suitable manner to the applicator frame 62 between a pair of flanged bracket members 152, 153. The controlled downward and inward movement of the feeder arm brings the wiper finger 150 into pressure contact with the back of the tape which is being wound on the coil by the rotational movement thereof.

When the coil perimeter is almost completely taped, the arm has moved to a position as shown in FIG. 3b. In this position, in keeping with the invention, the tape T is severed cleanly and automatically. To this end, a serrated blade 155 is mounted above the applicator and immediately beneath the bracket 153 which secures the blade above the applicator pad. During early progress of the arm 50 in its downward movement the tape is moving past the blade edge at a short distance therefrom, but as the arm completes a cycle the blade engages the tape in a plane transverse to its flow. The tape is tense between the spring loaded roll 67 and the coil C, and arm movement at this point in the cycle is rapid, thus severing of the tape is accomplished quickly and without complication. The free end $T_2$ of the tape on the coil is immediately engaged by the wiper 150 and pressed to the coil perimeter.

The arm 50 continues to the FIG. 3 position and the wrapping is completed, the entire cycle taking approximately one (1) second's time.

As a further feature of the invention, and in keeping with the objective of doing the job automatically and in a minimum time, means is provided for automatically disposing of the finished coil at the end of the cycle. More specifically, the ejecting of the wrapped coil is provided for, and is accomplished automatically in timed relation with the completion of the wrapping cycle.

Thus, referring particularly to FIGS. 2, 4 and 7, an exemplary mechanism for expelling the coil from the arbor is shown. In this instance, the feature is accomplished through ejector sleeve 173 which is pinned to an internal connecting rod 175 by a pin 176. The ejector sleeve is equipped with ejector fingers 177 having inturned ends 178 which normally rest behind the coil (see FIG. 4) while the same is being wrapped.

The ejector sleeve is constructed to be driven longitudinally against the coil with sufficient force to eject the coil into a basket or onto a conveyor belt or like receptacle. This is conveniently accomplished by means of a pneumatic cylinder 180 tied into the main pneumatic system. Referring to FIG. 2, the ejector cylinder is connected between the main branch lines 122 and 124 with a limit valve 140 disposed in one such connectnig line. A hand valve 183 is also provided with makes the ejector feature selective.

The ejector cylinder is normally withdrawn with high pressure in the line 124 acting on the forward end of the plunger 185. Referring to FIG. 4, in this position, the rod 175 is urged to a fully retracted position (as shown) by coil compression spring 190 acting, respectively, against the enlarged head 192 of the rod, and the face of the shaft mounting the gear 107. The arbor 18 is thus left open to receive a coil.

A minimum amount of time shiuld be required to accomplish ejection, and the present invention provides mechanism which accomplishes a rapid punching motion and return for quick removal of the coil from the arbor. And this is accomplished with no more than one shift of the normal pressure otherwise applied in the main branch lines. Again referring to FIG. 4, the end of the plunger is formed with a knob 195 about which a longitudinal sleeve 197 is conveniently fastened so as to permit angular motion about the knob as well as mutual reciprocation. This portion of the ejector is encased in a housing 200 which fastens by screws 201 to the back of the main machine housing 11 where an aperture 203 is provided for passage of the rod and spring. The housing 200 has an enlarged cavity 205 and the end opposite the plunger is fitted with a thick ring 207 which is conveniently retained by a snap ring 208. The internal side 210 of the ring is beveled inwardly, converging toward the left-hand face 211 as seen in FIG. 4. The rod 175 passes through the ring, and in its fully extended position contacts the edge of the sleeve at a point 215.

The ejector is energized as soon as the wrapping of the coil is completed and the arm 50 is out of the way. Thus, the valve 140, previously noted, is positioned to be engaged by the stop rod 137 when the rack 95 has completed its return to the right (FIG. 2). When the valve is so engaged, pressure is applied from line 184 to the rear of the cylinder through line 217 to force the plunger 185 to extend. Note that pressure in line 124 previously acting to retract the plunger has been relieved when the spool valve 145 was shifted through valve 139.

The cylinder is constructed to cause rapid advance of the plunger, and thus the sleeve 197 is pushed against the rod 175, forcing it against the pressure of the spring 190. This rapid motion is transmitted by the rod to the ejector sleeve 173, and the coil is knocked from the arbor 18 by the fingers 178.

The return of the ejector fingers is accomplished in a like rapid fashion by the sleeve 197, ring 207 and spring 190. As the ejector reaches its extended limit the sleeve 197 engages the side walls 210 of the ring and is tipped upwardly into a coaxial disposition with the rod (see FIG. 7) which is then free from the influence of the sleeve and is returned by the spring 190, into the center of the sleeve, and the ejector retracts with the rod to the position shown in dotted lines in FIG. 7. At the beginning of the next cycle, pressure in line 124 causes the plunger to return and the sleeve again tips into abutment with the rod head 192 (FIG. 4). The ejected part is on its way to the next operation and the machine is ready for the next cycle, all in a fraction of a second.

In wrapping certain parts such as electrical coils it is necessary to perform additional operations on the part during wrapping. Such an additional operation might include the freeing of electrical leads to be passed sideways from under the tape. In order that the invention may be as versatile as possible, provision is made for "interrupting" the wrapping cycle temporarily, and at a desired time so as to permit the performance of additional operations on the part being wrapped.

In accomplishing this feature of the invention, an interrupter system is integrated into the main pneumatic system, and includes a cylinder 225, having an enclosed piston which moves an externally extending plunger for movement coaxialy with the movement of the rack 95.

The cylinder is constructed to provide a plunger stroke which is shorter than the travel of the rack, and the plunger itself is adjustable by a nut 228 so as to permit variation in its effective length. Thus, when the rack 95 moves to the left the pressure applied to the end of the plunger 226 causes it to follow the rack to the extent of its travel and there stop, as the rack completes its travel. On the return stroke of the rack the end of the plunger engages it at a predetermined position in the rack travel. The cylinder is further constructed so as to have a piston which is of greater diameter than that of the main cylinder 132 and thus with the same pressure source applied to both, the plunger 226 will resist further movement of the rack and the cycle is stopped. Any necessary operation may then be performed on the coil. When the operation is completed, the palm button 230 is depressed which operates through spool valve 231 to exhaust the pressure in line 234 and thereby permit the plunger 226 to withdraw against the force applied to the rack by the main cylinder 132. At the completion of the cycle the ejector is energized as before and this machine is conditioned for the next cycle.

Marking or coding of electrical parts such as coils is not easily accomplished after the part is wrapped. Yet where coding is done on tape beforehand, considerable reliance is placed on the wrapper's ability to not use too much or too little tape so that the coding will be accurate on each strip. In keeping with the present invention, however, coding becomes a highly accurate technique which is accomplished automatically by integrating the function with the machine operation. A coding device indicated at 250, is constructed in accordance with these principles and is illustrated in FIGS. 1 and 6. The coder comprises a supporting plate 252 which is positioned on the face of the machine by a pair of guide shafts 254, 255, passing through a guide support 256 provided for the purpose. A knurled thumb screw 259 screws the coder in position.

Coding or stamping is accomplished by a swingable embossed plate 265 mounted on an arm 267 which is moved by means of a cylinder 270 between a horizontal ink pad 272 and the tape T threaded between the guide spindle 37 and 38. A tape protecting pressure block 275 mounts behind the tape to permit impressing the tape without tearing or other damage.

The coder is integrated with the pneumatic system as seen in FIG. 2, and may be optionally excluded by hand valve 277. The cylinder piston which drives plunger 280 extends to ink and retracts to stamp the tape. Thus, stamping occurs during the first phase of the cycle. When the feeder arm 50 is moving upwardly, the tape becomes slack between the guide spindle 39 and roller 54, so that no tape movement is experienced between spindles 37 and 38 which hold the tape firmly between them.

The coder is integrated into the power system by connecting the lower end of the cylinder 270 to the branch line 124, or the pressure side, during initial rack movement. The plunger is thus retracted, bringing the plate 265 against the tape for stamping the same. When the spool valve 145 reverses and the rack begins to return the plunger 280 extends by pressure applied through the line 122 and operates a crank mechanism 285 which moves the arm 267 downward and against the ink pad and coding is complete. Since the tape moves the desired amount in each cycle to wrap one object, the coding is always central and always readable on each wrapped article.

Figure 9:
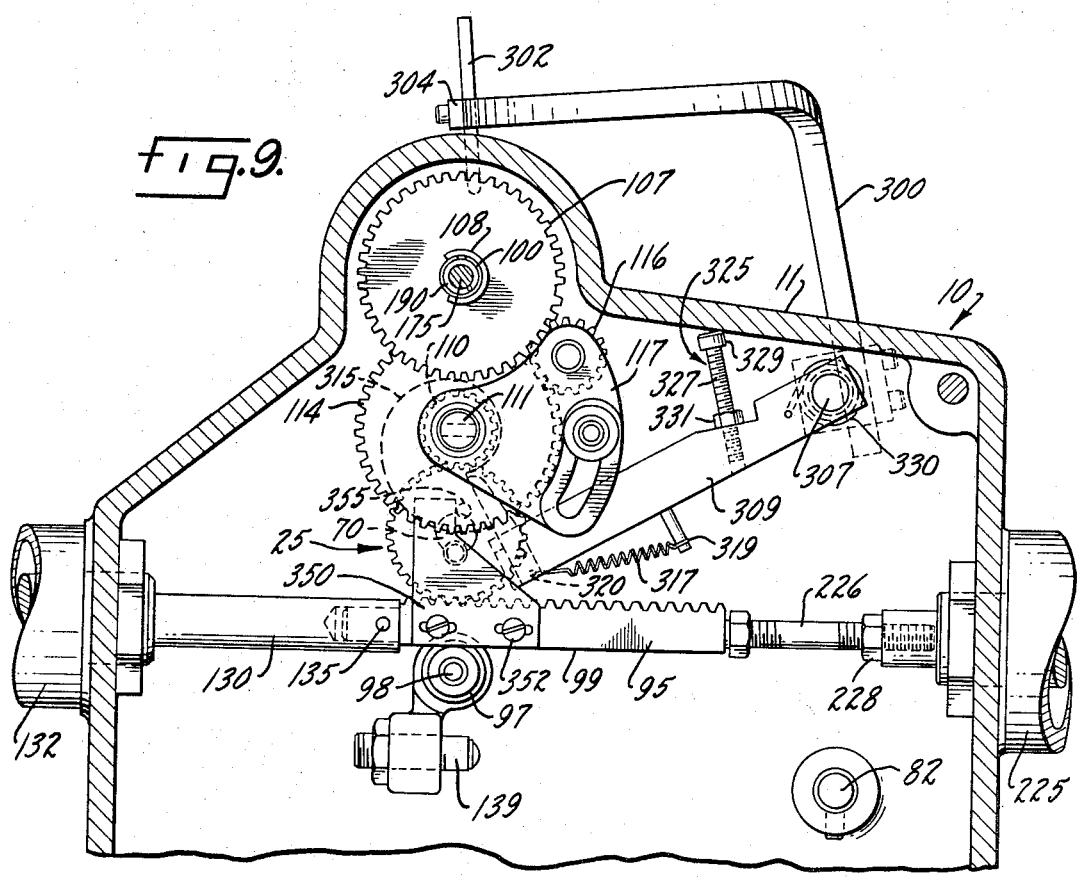
FIG. 9 is a section taken along line 5—5 of FIG. 4, showing alternative wiper means.
Figure 10:
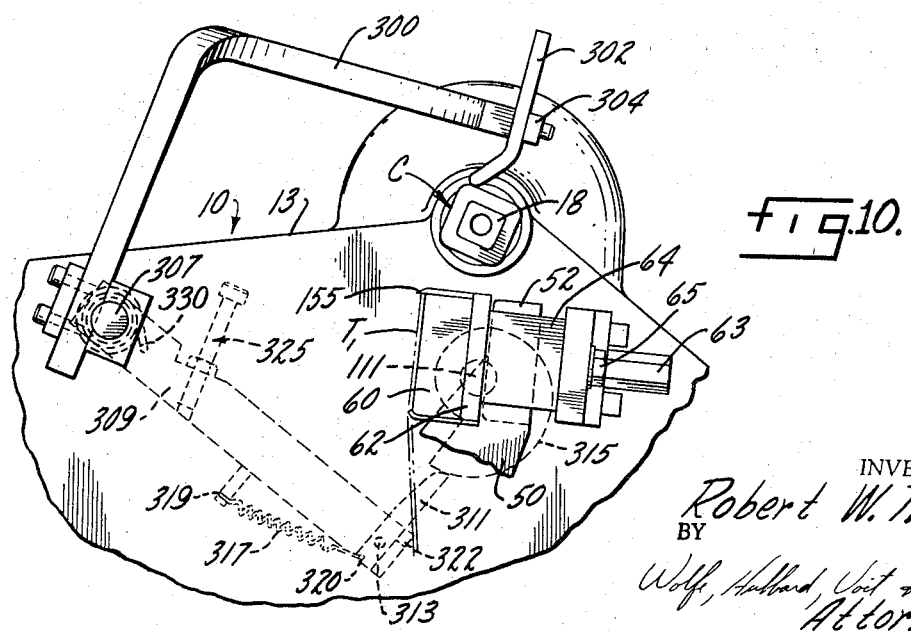
FIG. 10 illustrates the wiping action of the alternative wiper device of FIG. 9.

Referring now particularly to FIGS. 9 and 10, the feature of applying a sealing pressure to the tape about the coil on the arbor is accomplished in alternative fashion by the mechanism there illustrated.

As described with respect to the FIG. 3 embodiment, a wiper 150 is employed to apply pressure to the tape wrapped upon the coil for sealing purposes, as well as to assure that the end of the tape is in place, and not free to come loose. In FIGS. 9 and 10, the position and operation mechanism of the wiper has been altered somewhat without affecting the basic function thereof. As shown, a wiper mechanism is operatively mounted independently of the tape wrapping mechanism 20. An elongated curved arm 300 is provided which carries a wiper 302 in the bifurcated end 304 thereof. The end portion 304 releasably engages the wiper blade 302 to permit the position of the blade to be adjusted with respect to the arbor 18 of the device.

The other end of the arm 300 is mounted on a shaft 307 which is journaled in the housing of the machine for limited rotation.

Referring particularly to FIG. 9, in order to coordinate the swinging movement of the wiper arm 300, it is drivingly engaged with the machine mechanism by means of an elongated guide link 309 which is likewise engaged with the shaft 307 inside the machine. At the other end of the link 309 a cam follower 311 is pivotally mounted by pin 313 where it is in position to be engaged by a drive cam 315 mounted to the shaft 111 of the machine. Because the wiper mechanism is to be rendered operative during only a portion of the operation cycle of the machine, and since the shaft 111 rotates in both directions under the influence of the drive rack, the cam follower is constructed for response to the cam rotation in only one direction. To this end, the follower 311 is resiliently biased toward a position at substantially right angles to the arm 309 by a spring 317, having one end thereof fastened to the arm 309 by a pin 319 provided therefor, and the other end thereof being fastened to the cam follower 311 in a hole 320. A stop 322 on the arm 309 holds the follower in the upright position, preventing it from yielding completely to the spring 317. Thus, while the follower may retreat to a position substantially parallel with the arm 309 by rotating counterclockwise (as seen in FIG. 10) against the force of the spring 317 upon clockwise rotation of the cam 315, the stop 322 retains the follower 311 in the substantially perpendicular position shown during counterclockwise cam rotation.

The initial position of the arm 309, and accordingly the wiper arm 300, is established by an adjustable stop 325, comprising a screw 327, having a rubber or like resilient tip 329 which engages the top of the casing 11. By simply rotating the screw 327 into or out of a fixed nut 331, secured to the arm 309, the initial position of the arm 309 is established. In order to retain the wiper arm 300, in its initially raised inoperative position as shown in FIG. 9, a torsion biasing spring 330 may be employed to establish the initial position of the wiper arm.

Referring specifically to FIG. 9, the shaft 111, and accordingly the cam 315, rotates counterclockwise during the initial wrapping motion of the machine as the rack 95 moves to the left, as seen in that figure. Once the wrapping of the coil has been completed, the direction of the rack 95 is reversed, moving toward the right, therefore reversing the direction of the shaft 111 and the cam 315. As noted, counterclockwise movement of the cam 315 results in no movement of the wiper arm 300 because the cam follower, which is spring-biased, will merely retreat into a position substantially parallel with the link 309. However, when the cam is reversed, and is rotating clockwise, the cam engages the follower 311 in a direction which moves the cam follower against the stop 322, thus holding it relatively rigid with respect to the link 309. The cam follower, will, therefore, urge the link 309 to rotate counterclockwise (in FIG. 9), and likewise the shaft 307 and the wiper arm 300 is rotated a proportionate amount. This brings the wiper blade 302 into engagement with the tape on the surface of the coil as the rotative direction of the coil is reversed by rightward movement of the rack. The application pressure, of course, is adjustable by the position of the wiper in the arm as well as by the cam configuration. Thus, the tape is firmly adhered to the coil surface in keeping with the invention.

The invention further provides an alternative means of establishing the initial position of the machine, and stopping the return or rightward movement of the rack prior to ejection of the coil from the arbor. Referring to FIG. 9, a stop member 350 is secured by means of fasteners 352 to the rack proper. Slots formed in the stop member are elongated to permit limited lateral adjustment of the stop position. The stop projects upwardly into proximity with the gear 114, which is provided with a stop pin 355. The pin is so located on the gear periphery that with the rack in the position shown, the stop 350 and pin are in abutting relationship. Thus, whenever the rack is being returned to the right, as seen in that figure, a stop position may be selectively set, which will be reached when the gear 114 and stop 350 are so positioned that the pin 355 on the gear engages the stop. In this manner, the stop is provided as an efficient means of timing the machine operation integral with the actual drive transmission.

Thus, a variety of functions is accomplished by a compact inexpensive device which requires no more human effort than the pressing of a button to accomplish a job previously requiring hand labor to complete.

I claim as my invention:

1. A mechanism for applying tape about an article comprising, in combination, a frame, a support for said article rotatably mounted on said frame, a spindle on said frame for rotatably holding a roll of tape, a tape feeder mounted on said frame for oscillating movement between first and second limit positions, an applicator pad mounted on said feeder so that the pad is pressed against an article on said support when the feeder is in said first limit position, a feed roller mounted on said feeder for one-way rotation, means on said frame for guiding tape from a roll on said spindle to said roller so that tape extending from said means to said pad may be looped about the roller, said roller not being rotatable to feed said looped tape from said pad so that movement of said feeder from said first to said second limit position pulls on tape looped about the roller to draw up more tape from the storage roll, a blade on said feeder adjacent said pad at the opposite end from said feed roller, said blade being positioned to sever tape extending between an article on said support and said feed roller as the feeder moves toward said second limit position, and drive means for oscillating said feeder and rotating said support as the feeder moves from said first to said second limit position.

2. The combination of claim 1 including a manually operable device for halting operation of said drive means so as to interrupt cycling of said mechanism.

3. The combination of claim 1 including an ejector on said frame for discharging an article from said support, and means for operating said ejector as said feeder approaches said second limit position.

4. The combination of claim 1 including a flexible wiper finger mounted on said feeder so as to resiliently press tape against an article on said support as the feeder moves from said first to said second limit position.

5. The combination of claim 1 including a movable printing device mounted on said frame, and means for actuating said printing device to engage tape extending between a roll on said spindle and said feeder as the latter moves from said second to said first limit position.

6. In a device for automatically applying tape to the perimeter of an article disposed upon a rotatable arbor, means for automatically ejecting the article from the arbor when the article has been wrapped, including a reciprocable powered piston responsive to the completion of the wrapping of the article, ejector fingers disposed adjacent the article, an elongated rod connected with said fingers, said rod being spring biased in a direction to urge said fingers away from the article, a sleeve at the end of said powered piston mounted thereto so as to permit angular tipping thereof, the end of said sleeve when tipped adapted to engage said rod so that when said piston is actuated said sleeve urges said rod against its normal spring bias thereby forcing said fingers against the article mounted on the arbor with a rapid motion for ejecting the same from the arbor, and a tapered ring disposed about said rod and adapted to engage the edge of said sleeve at a predetermined position in the forward travel thereof so as to axially align the same with said piston whereby the sleeve is disengaged from said rod and said rod is permitted to return to its normally spring biased position so as to return said ejector fingers.

References Cited

UNITED STATES PATENTS

| 1,944,142 | 1/1934 | Abbott et al. | 156—475 XR |
| 2,006,116 | 6/1935 | Schmiedel | 156—475 XR |
| 2,594,316 | 4/1952 | Krveger et al. | 53—70 |
| 2,826,376 | 3/1958 | Wallin | 242—81 |

EARL M. BERGERT, *Primary Examiner.*

M. L. KATZ, *Assistant Examiner.*